US007657616B1

(12) United States Patent
Poling et al.

(10) Patent No.: US 7,657,616 B1
(45) Date of Patent: Feb. 2, 2010

(54) AUTOMATIC DISCOVERY OF USERS ASSOCIATED WITH SCREEN NAMES (75) Inventors: Robert Poling, El Cajon, CA (US); Richard S. Pugh, Poway, CA (US)

(73) Assignee: Quest Software, Inc., Aliso Viejo, CA (US)

( * ) Notice: Subject to any disclaimer, the term of this patent is extended or adjusted under 35 U.S.C. 154(b) by 904 days.

(21) Appl. No.: 10/167,229

(22) Filed: Jun. 10, 2002

(51) Int. Cl.
G06F 15/173 (2006.01)
(52) U.S. Cl. ..................................... 709/223
(58) Field of Classification Search ................ 709/223, 709/224, 206
See application file for complete search history.

(56) References Cited

U.S. PATENT DOCUMENTS

| 4,425,618 | A | 1/1984 | Bishop et al. |
| 5,161,192 | A | 11/1992 | Carter et al. |
| 5,249,292 | A | 9/1993 | Chiappa |
| 5,339,430 | A | 8/1994 | Lundin et al. |
| 5,421,017 | A | 5/1995 | Scholz et al. |
| 5,761,415 | A | 6/1998 | Joseph et al. |
| 5,907,678 | A | 5/1999 | Housel, III et al. |
| 5,968,176 | A | 10/1999 | Nessett et al. |
| 5,983,270 | A | 11/1999 | Abraham et al. |
| 6,081,900 | A | 6/2000 | Subramaniam et al. |
| 6,128,298 | A | 10/2000 | Wootton et al. |
| 6,154,775 | A | 11/2000 | Coss et al. |
| 6,226,372 | B1 | 5/2001 | Beebe et al. |
| 6,312,337 | B1 | 11/2001 | Edwards et al. |
| 6,317,837 | B1 | 11/2001 | Kenworthy |
| 6,321,337 | B1 | 11/2001 | Reshef et al. |
| 6,334,215 | B1 | 12/2001 | Barker et al. |
| 6,415,318 | B1 | 7/2002 | Aggarwal et al. |
| 6,513,013 | B1 | 1/2003 | Stephanou |
| 6,513,122 | B1 | 1/2003 | Magdych et al. |
| 6,519,703 | B1 | 2/2003 | Joyce |
| 6,557,037 | B1 | 4/2003 | Provino |
| 6,600,726 | B1 | 7/2003 | Nevo et al. |

(Continued)

FOREIGN PATENT DOCUMENTS

DE 198 10 802 9/1999

OTHER PUBLICATIONS

International Search Report for related PCT International Application No. PCT/US03/18311, filed Jun. 10, 2003.

(Continued)

Primary Examiner—Andrew Caldwell
Assistant Examiner—Bradford F Fritz
(74) Attorney, Agent, or Firm—Knobbe, Martens, Olson & Bear, LLP (57) ABSTRACT

Automatic discovery of users associated with screen names for rogue protocols. A local server associates screen names with users, updating those associations in response to the protocol. The local server intercepts protocol messages, determines if they relate to unknown users, and obtains information associating screen names with users. Policy rules are applied to all screen names for the same user in an aggregated manner. The local server sends a request to an authorization server coupled to the local network, including the IP address for that screen name. The authorization server interrogates a registry file on the user workstation to obtain a GUID for that user, and from that GUID obtains a unique logon name for that user from the domain controller for a local network.

14 Claims, 3 Drawing Sheets

U.S. PATENT DOCUMENTS

| | | | |
|---|---|---|---|
| 6,631,363 | B1 | 10/2003 | Brown |
| 6,683,954 | B1 | 1/2004 | Searle |
| 6,715,084 | B2 | 3/2004 | Aaron et al. |
| 6,721,890 | B1 | 4/2004 | Shrikhande |
| 6,751,562 | B1* | 6/2004 | Blackett et al. ............... 702/61 |
| 6,757,732 | B1* | 6/2004 | Sollee et al. ................ 709/227 |
| 6,775,284 | B1 | 8/2004 | Calvignac et al. |
| 6,781,990 | B1 | 8/2004 | Puri et al. |
| 6,853,851 | B1 | 2/2005 | Rautiola et al. |
| 6,873,988 | B2 | 3/2005 | Herrmann et al. |
| 6,941,349 | B2 | 9/2005 | Godfrey et al. |
| 6,944,555 | B2 | 9/2005 | Blackett et al. |
| 6,963,858 | B2 | 11/2005 | Wang et al. |
| 6,983,370 | B2 | 1/2006 | Eaton et al. |
| 7,013,326 | B1 | 3/2006 | Suzuki et al. |
| 7,068,769 | B1* | 6/2006 | Weaver et al. ............ 379/201.1 |
| 7,076,650 | B1 | 7/2006 | Sonnenberg |
| 7,111,044 | B2 | 9/2006 | Lee |
| 7,131,003 | B2 | 10/2006 | Lord et al. |
| 7,143,439 | B2 | 11/2006 | Cooper et al. |
| 7,159,109 | B2 | 1/2007 | Egevang |
| 7,191,213 | B1 | 3/2007 | Bouchard et al. |
| 7,200,634 | B2 | 4/2007 | Mendiola et al. |
| 7,209,957 | B2 | 4/2007 | Patron et al. |
| 7,225,226 | B2 | 5/2007 | Fitzpatrick et al. |
| 7,248,978 | B2 | 7/2007 | Ransom |
| 7,266,585 | B2 | 9/2007 | Kay et al. |
| 7,266,594 | B2 | 9/2007 | Kumbalimutt et al. |
| 7,284,034 | B2 | 10/2007 | Matsa et al. |
| 7,302,574 | B2 | 11/2007 | Conwell et al. |
| 7,321,969 | B2 | 1/2008 | Schoen et al. |
| 7,401,054 | B1 | 7/2008 | Shah et al. |
| 7,401,158 | B2 | 7/2008 | Beauchamp et al. |
| 7,412,490 | B2 | 8/2008 | Matsa et al. |
| 7,428,590 | B2 | 9/2008 | Miller et al. |
| 7,437,442 | B2 | 10/2008 | Ashiya |
| 7,483,982 | B2 | 1/2009 | Hegli et al. |
| 2002/0064149 | A1 | 5/2002 | Elliott et al. |
| 2002/0103931 | A1 | 8/2002 | Mott |
| 2002/0116643 | A1 | 8/2002 | Raanan et al. |
| 2002/0129088 | A1 | 9/2002 | Zhou |
| 2002/0141378 | A1 | 10/2002 | Bays et al. |
| 2002/0178227 | A1* | 11/2002 | Matsa et al. ................ 709/206 |
| 2002/0178231 | A1 | 11/2002 | Matsa et al. |
| 2002/0184357 | A1* | 12/2002 | Traversat et al. ............ 709/223 |
| 2002/0188657 | A1* | 12/2002 | Traversat et al. ............ 709/201 |
| 2002/0198949 | A1 | 12/2002 | Maehiro |
| 2003/0018726 | A1* | 1/2003 | Low et al. ................... 709/206 |
| 2003/0055982 | A1 | 3/2003 | Noro et al. |
| 2003/0055994 | A1 | 3/2003 | Herrmann et al. |
| 2003/0074410 | A1 | 4/2003 | Kay et al. |
| 2003/0101343 | A1 | 5/2003 | Eaton et al. |
| 2003/0131061 | A1 | 7/2003 | Newton et al. |
| 2003/0145226 | A1 | 7/2003 | Bruton, III et al. |
| 2003/0154399 | A1 | 8/2003 | Zuk et al. |
| 2003/0204722 | A1 | 10/2003 | Schoen et al. |
| 2003/0204741 | A1 | 10/2003 | Schoen et al. |
| 2003/0208545 | A1 | 11/2003 | Eaton et al. |
| 2004/0039827 | A1 | 2/2004 | Thomas et al. |
| 2004/0088423 | A1 | 5/2004 | Miller et al. |
| 2004/0103318 | A1 | 5/2004 | Miller et al. |
| 2004/0109518 | A1 | 6/2004 | Miller et al. |
| 2004/0111623 | A1 | 6/2004 | Miller et al. |
| 2004/0117501 | A1 | 6/2004 | Day et al. |
| 2004/0162724 | A1 | 8/2004 | Hill et al. |
| 2004/0230684 | A1 | 11/2004 | Smolinski |
| 2004/0254998 | A1 | 12/2004 | Horvitz |
| 2005/0149630 | A1 | 7/2005 | Smolinski et al. |
| 2006/0031365 | A1 | 2/2006 | Kay et al. |
| 2006/0064469 | A1 | 3/2006 | Balasubrahmaniyan et al. |
| 2007/0112957 | A1 | 5/2007 | Shastri et al. |
| 2007/0124577 | A1 | 5/2007 | Nielsen et al. |
| 2008/0196099 | A1 | 8/2008 | Shastri |
| 2008/0256257 | A1 | 10/2008 | Miller et al. |

OTHER PUBLICATIONS

International Search Report for related PCT International Application No. PCT/U504/04837, filed Feb. 14, 2004 dated Oct. 2, 2007.
International Search Report for related PCT International Application No. PCT/U504/029848, dated Nov. 17, 2008.
International Search Report for related PCT International Application No. PCT/U505/44089, dated Jan. 17, 2007.
FreeNews.com. "Akonix Launches First Instant Messaging Security Solution for Remote Users; L7 Remote User Agent Ensures I'm Use by Mobile Employees Meets Corporate Compliance and Security Needs"[online] Oct. 11, 2005[retrieved on Aug. 12, 2007] Retrieved from the Internet <URL: http://www.freshnews.com/news/computers-internet/article_27348.html?Akonix>.
International Search Report for related PCT International Application No. PCT/US06/60526, dated Mar. 27, 2008.
Jan. 6, 2009 Final Office Action and Response to Jan. 6, 2009 Office Action (mailed May 6, 2009) in co-pending U.S. Appl. No. 10/459,421, filed Jun. 10, 2003.
Response to Dec. 23, 2008 Office Action (mailed Apr. 23, 2009) and Jun. 29, 2009 Notice of Allowance in co-pending U.S. Appl. No. 10/459,408, filed Jun. 10, 2003.

* cited by examiner

AUTOMATIC DISCOVERY OF USERS ASSOCIATED WITH SCREEN NAMES

BACKGROUND OF THE INVENTION

1. Field of the Invention

The invention relates to automatic discovery of users associated with screen names and other aliases, such as for example those used with rogue protocols like "Instant Message" protocols, and the like.

2. Related Art

It is sometimes desirable to apply policy rules to messages in an enterprise network. This is a particular concern when those messages relate to a protocol that might not be directed to business aspects of the enterprise network. For example, a number of protocols have arisen for recent use that individual users might apply for personal use, but which are subject to possible abuses. Some of these protocols (often called "rogue protocols" herein) include IM (instant message) protocols, P2P (peer-to-peer) and other file sharing protocols, interactive game protocols, distributed computing protocols, and ".NET" or "SOAP" methods of computer program interaction. Some of these possible abuses include accidental delivery of a computer virus to a workstation within the enterprise network, unrecorded communications between workstations within the enterprise network and outside parties, and other unauthorized user behavior on the enterprise network.

One problem that has arisen in the art of applying policy rules to protocol messages is that, even when recognized, some protocol messages associate the users sending or receiving those protocol messages with a "screen name" rather than an otherwise identifiable user name. In this context, the phrase "protocol messages" is intended to include not just individual messages, but also sequences of messages and streams of information, sent either unidirectionally or indirectly, and sent either unicast or multicast. Without being able to reliably associate protocol messages with identifiable user names, it may be possible for users to circumvent policy requirements and enforcement of those policy requirements. As a result, possible abuses of the enterprise network might become more difficult to detect and might become more common.

SUMMARY OF THE INVENTION

The invention relates to automatic discovery of actual users associated with screen names for a possible "rouge protocol" such as IM (instant messaging). A local server for the rouge protocol maintains a set of associations between screen names and actual users, automatically updating that set of associations in response to messages and sessions related to the rouge protocol. The local server intercepts messages in selected rouge protocols, determines if those messages relate to unknown users, and obtains information with which to associate the rouge protocol screen name with an actual user. In a preferred embodiment, the local server is integrated with a policy-enforcement gateway (further described in a related application), which applies policy rules to all screen names associated with the same user in an aggregated manner.

In a preferred embodiment, the local server interacts with a domain controller for a local network. When messages are received from, or destined for, individual users coupled to the local network, the local server can obtain information uniquely identifying those users without any requirement for cooperation by workstations under control of those users. To obtain information with which to associate the rouge protocol screen name with an actual user, the local server sends a request to an authorization server, which is an auxiliary device coupled to the local network; the request includes the IP address associated with the rouge protocol message to (or from) the screen name which the local server desires to associate with an actual user. The authorization server interrogates a registry file on the user workstation with that IP address to obtain a GUID (global user ID) associated with that individual user, and obtains a unique logon name for the user associated with that GUID from the domain controller for the local network. Having obtained this information, the authorization server returns information to the local server associating that screen name with a particular user name (as well as the particular IP address and GUID).

INCORPORATED DISCLOSURES

Inventions described herein can be used in conjunction with technology described in the following documents:

U.S. patent application Ser. No. 10/167,228 Express Mail Mailing No. EL734814811US, filed Jun. 10, 2002, in the name of the following inventors, Dmitry Shapiro, Rick Pugh, and Randy Miller, entitled "Extendible Gateway for Protection against Rogue Protocols", and U.S. Patent Application Ser. No. 60/387,761 Express Mail Mailing No. EL734814839US, filed Jun. 10, 2002, in the name of the following inventors, Randy Miller, Robert Poling, and Rick Pugh, entitled "Proxy Enforcer for Rogue Protocol Messages", and applications claiming priority therefrom.

These documents are hereby incorporated by reference as if fully set forth herein. All other documents cited herein are also hereby incorporated by reference as if fully set forth herein. The content of incorporated documents is sometimes referred to herein as the "incorporated disclosure."

DETAILED DESCRIPTION OF THE PREFERRED EMBODIMENT

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography

The following terms relate or refer to aspects of the invention or its embodiments. The general meaning of each of these terms is intended to be illustrative and in no way limiting.

client, server—In general, the terms "client" and "server" refer to relationships between the client and the server, not necessarily to particular physical devices. Thus, the phrase "client device" includes any device taking on the role of a client in a client-server relationship. There is no particular requirement that client devices must be individual physical devices; they can each be a single device, a set of cooperating devices, a portion of a device, or some combination thereof. Moreover, any particular device can be considered a client with regard to a first client-server relationship and can be considered a server with regard to a second client-server relationship, even if those relationships are in fact between the same two devices. Similarly, the phrase "server device" includes any device taking on the role of a server in a client-server relationship. There is no particular requirement that server devices must be individual physical devices; they can each be a single device, a set of cooperating devices, a portion of a device, or some combination thereof. For example, but without limitation, the client device and the server device in a client-server relation can actually be the same physical device, with a first set of software elements serving to perform client functions and a second set of software elements serving to perform server functions.

local network, enterprise network—In general, this refers to a collection of computers isolated on one side of firewall device from an external network (such as the internet).

local server, remote server—In general, the phrase "local server" refers to a server coupled to the enterprise network and logically local to it, while the "remote server" refers to a server not disposed on the enterprise network but instead accessible using an external network (such as the internet). Thus, the local server intercepts rogue protocol messages originally intended for processing at the remote server, and might or might not forward those rogue protocol messages to the remote server for further processing.

messages, protocol messages—In general, this refers to any set of messages using a rogue protocol, not necessarily just individual messages, but also sequences of message sages and streams of information, sent either in one direction or bi-directly, and sent either unicast or multicast. For example, where the rogue protocol is a variant of IM, a protocol message might include a message delivering text from one user to another user. Alternatively, where the rogue protocol is a P2P file-sharing protocol, a protocol message might include a message delivering a file from one user to another user.

protocol, rogue protocol—In general, this refers to any protocol against which it is desired to protect the enterprise network from abuse, including IM (instant message) protocols, P2P (peer-to-peer) and other file sharing protocols, interactive game protocols, distributed computing protocols, and ".NET" or "SOAP" methods of computer program interaction.

Although the invention is described with regard to instant messaging, there is no particular requirement that protocol messages detected and screened by the invention are so limited. Moreover, there is no particular requirement that instant messaging or other protocol messages must originate outside the local network; these messages might originate inside the local network and the destined for addressees outside the local network, or might originate inside the local network and the destined for addressees also within the local network.

unauthorized user behavior—In general, this refers to any behavior against which it is desired to protect the enterprise network, including accidental delivery of a computer virus to a workstation within the enterprise network, unrecorded communications between workstations within the enterprise network and outside parties, and other unauthorized user behavior on the enterprise network.

user, user name, user workstation—In general, this refers to an individual who might use resources on the enterprise network, the unique name assigned to that individual by the enterprise network, and any workstation used by that individual to access resources on the enterprise network. There is no particular requirement that a "user" must be a specific person; for example, a user name "STUDENT" might refer to one of a set of specified individuals.

The scope and spirit of the invention is not limited to any of these definitions, or to specific examples mentioned therein, but is intended to include the most general concepts embodied by these and other terms. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

Figure 1:
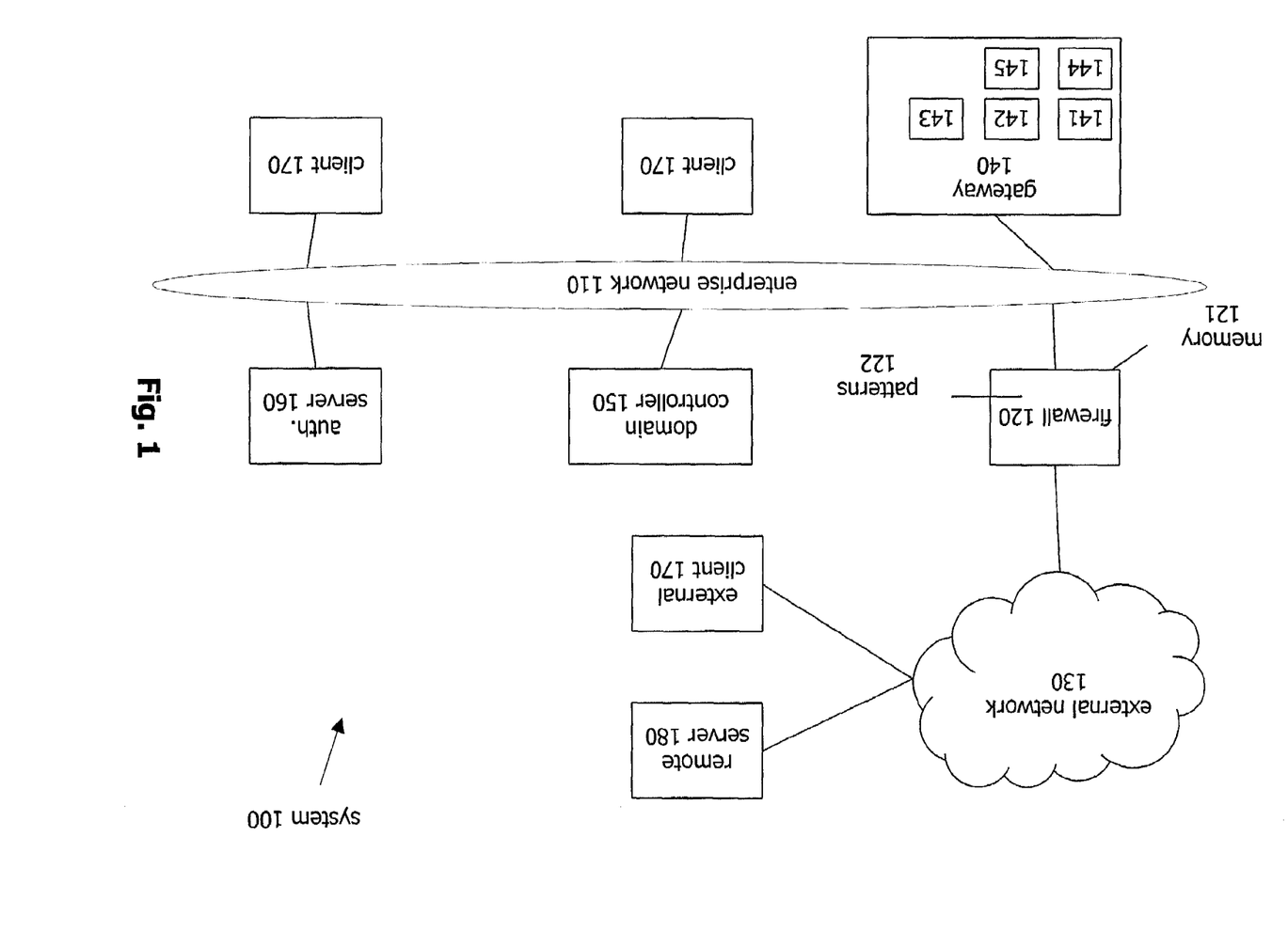
FIG. 1 shows a block diagram of a system on an enterprise network including a local server capable of associating screen names with users of rogue protocols.

FIG. 1 shows a block diagram of a system on an enterprise network including a local server capable of associating screen names with users of rogue protocols.

A system 100 includes an enterprise network 110 coupled either to a firewall device 120 or proxy server (not shown, but known by those skilled in the art), which are in turn coupled to an external network 130. Also coupled to the enterprise network 110 are a gateway 140, a domain controller 150, and authorization server 160, and at least one local client device 170. Also coupled to the external network 130 are (possibly) remote client devices 170, and a remote server 180.

As described herein, the enterprise network 110 includes one or more internal networks such as a LAN (local area network), WAN (wide area network), locally switched network or public switched network, some other communication technique, or some combination thereof, by which devices locally coupled to be enterprise network 110 might communicate with each other. Although an embodiment of the invention is described herein with regard to the enterprise network 110 including a LAN, there is no particular requirement that the enterprise network 110 must be disposed on a LAN, or in any other particular network configuration.

The firewall device 120 includes a conventional device for recognizing and intercepting messages formatted at selected levels of the OSI layered protocol model, and meeting selected filtering criteria by which the firewall device 120 might determine whether those messages carry information center to be received in a rogue protocol format. The firewall device 120 includes memory 121 having stored therein a set of recognition patterns 122 (sometimes called an "inspect script") selected by an administrator of that firewall device 120. The recognition patterns 122 include information sufficient to describe to the firewall device 120 which messages are disposed in the rogue protocol format.

Messages are directed to the gateway 140 using either a proxy server or the firewall device 120. The firewall device 120 redirects (in response to the recognition patterns 122) at least some of the messages it processes to the gateway 140. In a preferred embodiment, those messages are redirected using a conventional "CVP" technique, in which, after processing the message and determining that it should be further processed by the gateway 140, the firewall device 120 delivers that message to the gateway 140.

In a preferred embodiment, the external network 130 includes an internet. However, in alternative embodiments the external network 130 might include an internet, extranet, virtual private network, LAN, WAN, locally switched network or public switched network, some other communication technique, or some combination thereof. Although an embodiment of the invention is described herein with regard to the external network 130 including an internet, there is no particular requirement that the external network 130 must be disposed in any particular configuration.

The gateway 140 is further described in the incorporated disclosure. The gateway 140 includes a local server 141, an authentication module 142, and a policy enforcement module 143, as further described below. The local server 141 includes a user database 144, which maintains an association between actual users, their unique user names, and screen names used by those users with the rogue protocol.

The domain controller 150 is coupled to the enterprise network 110, and is capable of access to registry information at client devices 170. In a preferred embodiment, security restrictions limit the set of devices capable of access to registry information at client devices 170 to just the domain controller 150; however, there is no particular requirement for the invention to have this restriction. In alternative embodiments, the authorization server 160 or the gateway 140 might have direct access to registry information at client devices 170.

The authorization server 160 is coupled to the enterprise network 110, and is capable of interacting with the domain controller 150 to obtain registry information at client devices 170. In a preferred embodiment, security restrictions limit the set of devices capable of such interaction with the domain controller 150 to only devices selected by a network administrator for the enterprise network 110, and the authorization server 160 is selected as one of these devices. However, there is no particular requirement for the invention to have this restriction. In alternative embodiments, the gateway 140 might have this capability directly.

The client devices 170 include both local client devices 170 and remote client devices 170. Each client device 170 (or as sometimes referred to herein, user workstation) is associated with a user 171, who has a unique user name. The local client devices are coupled to the enterprise network 110, and are disposed for sending and receiving messages using a rogue protocol, either directly to the local server 141, or originally destined for the remote server 180 but intercepted by the gateway 140 and initially processed by the local server 141. The remote client devices 170 are coupled to the external network 130, and are disposed for sending and receiving messages using a rogue protocol, as further described herein, generally directly to the remote server 180.

The remote server 180 is coupled to the external network 130, and is disposed for sending and receiving messages using the rogue protocol, to and from client devices 170. For example, where the rogue protocol is an IM protocol, the remote server 180 is disposed for receiving IM messages from a sending client device 170 and sending those IM messages to a receiving client device 170.

Local Server Elements

Figure 2:
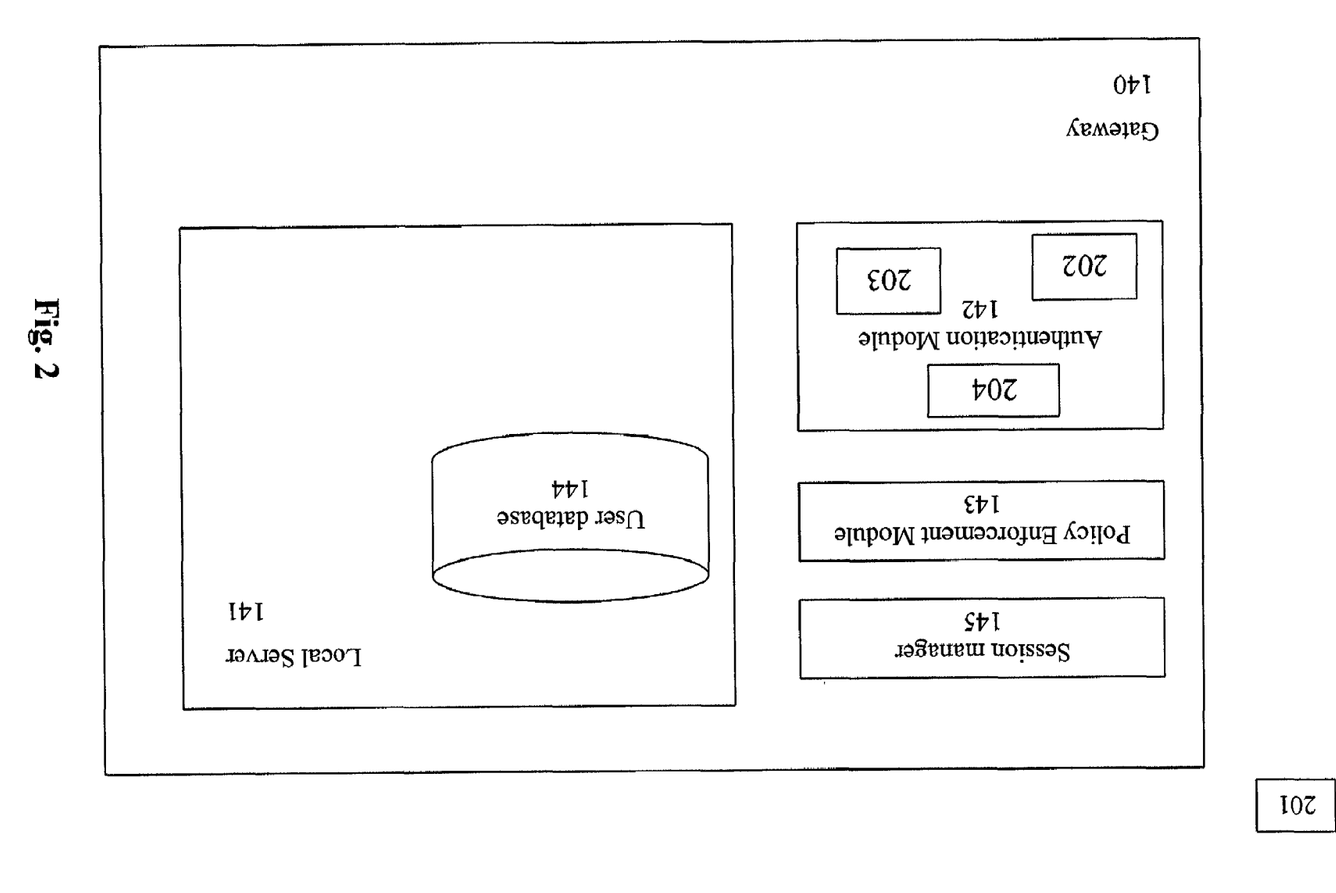
FIG. 2 shows a block diagram of a local server capable of associating screen names with users of rogue protocols.

FIG. 2 shows a block diagram of a local server capable of associating screen names with users of rogue protocols.

As described above, the gateway 140 (further described in the incorporated disclosure) includes a local server 141, an authentication module 142, and a policy enforcement module 143. The local server 141 includes a user database 144, which maintains an association between actual users, their unique user names, and screen names used by those users with the rogue protocol.

The gateway 140 includes a session manager 145, capable of receiving rogue protocol messages 201 when they are intercepted from client devices 170. The session manager 145 includes software elements capable of parsing the rogue protocol message, and determining the type of rogue protocol and its associated local server 141. Though skilled in the art will recognize, after perusal of this application, that the gateway 140 might include a plurality of local servers 141, each adapted for processing of a different type of rogue protocol.

The session manager 145 includes software elements capable of sending the original rogue protocol message, or information equivalent thereto, to the local server 141. The local server 141 includes software elements capable of generating a new-session event 202, indicating the receipt of a rogue protocol message.

The session manager 145 includes software elements capable of distributing the new-session event 202 to one or more other software elements within the gateway 140. Such other software elements include the authentication module 142.

The authentication module 142 includes software elements capable of receiving the new-session event 202, and disposed for acting thereon. The authentication module 142 includes software elements capable of sending a name-request message 203 to the authorization server 160, and for receiving a name-response message 204 from the authorization server 160. As further described below with regard to FIG. 3, the name-request message 203 sent by the authentication module 142 to the authorization server 160 includes at least an IP address for the client device 170 sending the original rogue protocol message 201. As also further described below with regard FIG. 3, the name-response message 204 sent by the authorization server 160 to the authentication module 142 includes at least a unique user name associated with the client device 170 sending the original rogue protocol message 201, and therefore associated with any screen name included in the original rogue protocol message 201.

The authentication module 142 includes software elements capable of interacting with the session manager 145 for determining if the session associated with the new-session event 202 (and therefore associated with the original rogue protocol message 201) still exists after receiving the name-response message 204 from the authorization server 160.

The authorization module 142 interacts with the user database 144 so as to store any new association between actual user and one or more screen names. The authorization module 142 also includes software elements capable of interacting with session manager 145 for updating a session object associated with the original new-session event 202 (and therefore associated with the original rogue protocol message 201), so as to indicate the actual user (and the unique user name associated with actual user) for which that session applies.

The session manager 145 includes software elements capable of interacting with the policy enforcement module 143, so as to determine whether to allow the original rogue protocol message 201 to be forwarded to its originally intended destination 170.

The session manager 145 includes software elements capable of forwarding the original rogue protocol message 201 (or a reconstituted or altered version thereof) to the originally intended destination client device 170. As described in the incorporated disclosure, a first version of the rogue protocol used by the sending client device 170 and a second version of the rogue protocol used by the receiving client device 170 need not be identical. Thus for example, the sending client device 170 might use a first rogue protocol and therefore a first local server 141, while the receiving client device 170 might use a second rogue protocol and therefore a second local server 141.

Method of Operation

Figure 3:
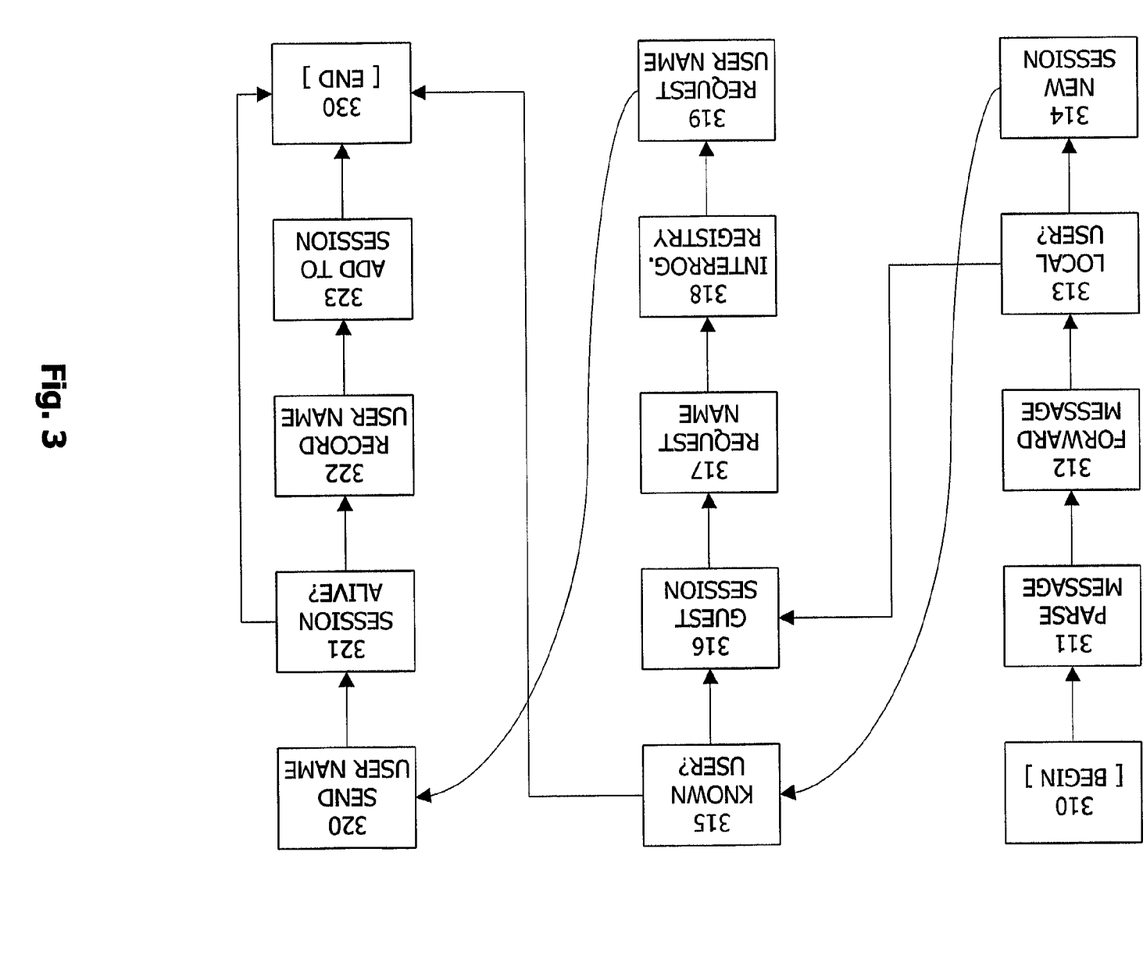
FIG. 3 shows a process flow diagram of a method including associating screen names with users of rogue protocols.

FIG. 3 shows a process flow diagram of a method including associating screen names with users of rogue protocols.

Although described serially, the flow points and steps of the method 300 can be performed by separate elements in conjunction or in parallel, whether asynchronously or synchronously, in a pipelined manner, or otherwise. There is no particular requirement that the method 300 must be performed in the same order in which this description lists flow points or steps, except where explicitly so indicated.

At a flow point 310, the gateway 140 is ready to receive a rogue protocol message.

At a step 311, the gateway 140 parses the message, and determines with which rogue protocol the message is associated.

At a step 312, the gateway 140 forwards the message to the local server 141 (and its protocol adapter, as further described in the incorporated disclosure) associated with the rogue protocol determined in the step just previous.

At a step 313, the gateway 140 determines whether the user sending the message is a local user (that is, coupled to the enterprise network 110) or a remote user (that is, coupled to the external network 130). If the sending user is a local user, the method 300 proceeds with the step 314. If the sending user is a remote user, the method 300 proceeds with the step 316.

At a step 314, the local server 141 within the gateway 140 generates a "new session" event in response to the message.

At a step 315, the local server 141 within the gateway 140 determines if the user sending the message is known to the local server 141 (that is, if the screen name associated with the user sending the message is present in the user database 144 maintained by the local server 141). If the user sending a message is known to the local server 141, then the method concludes at the flow point 330. If the user sending the message is not known to the local server 141, the method proceeds with the next step 316.

At a step 316, the local server 141 within the gateway 140 creates a "guest" session (that is, a new session with a new user initiating the session of "guest").

At a step 317, the local server 141 within the gateway 140 sends a message to the authorization server 160, requesting the authorization server 160 to obtain a unique user name associated with a screen name for the message. The message from the local server 141 to the authorization server 160 includes an IP address associated with the sender of the original rogue protocol message.

At a step 318, the authorization server 160 identifies the client device 170 having the IP address sent to it by the local server 141, and interrogates the registry at that client device 170 to determine a GUID (global user ID) for the user associated with that IP address.

Because the authorization server 160 directly interrogates the registry at the client device 170, the local server 141 at the gateway 140 is able to obtain information uniquely identifying users without any requirement for cooperation by those users, and without any requirement for cooperation by workstations under control of those users. In cases where an individual user using an IM rogue protocol might have a plurality of screen names; the local server 141 at the gateway 140 is able to associate all of those screen names in that plurality with the same unique user.

At a step 319, the authorization server 160 requests, from the domain controller 150, a unique user name associated with the GUID obtained in the previous step. The domain controller 150 responds by sending, to the authorization server 160, that unique user name.

At a step 320, the authorization server 160 sends the unique user name obtained in the previous step to the local server 141 at the gateway 140.

At a step 321, the local server 141 at the gateway 140 checks the session associated with the original rogue protocol message to determine if the session is still in progress. If the session is not still in progress (that is for example, the session was dropped by the sender of the original rogue protocol message), the method 300 concludes at the flow point 330. If the session is still in progress, the method continues with the next step 322.

At a step 322, the local server 141 at the gateway 140 records the unique user name, and its association with the screen name from the original rogue protocol message, in the user database 144 at the gateway 140.

At a step 323, the local server 141 at the gateway 140 records the unique user name with the session associated with the original rogue protocol message.

At a flow point 330, the local server 141 at the gateway 140 has determined the unique user name associated with the screen name from the original rogue protocol message. The gateway 140 is ready to further process that rogue protocol message, such as by applying policy rules for that user and that rogue protocol message.

In a preferred embodiment, the gateway 140 is adapted to aggregate its treatment of rogue protocol message with actual users, regardless of the screen names those actual users select for their rogue protocol communications. Thus, if an individual user has two separate screen names (say, "swemofsky31415926" and "swemofsky27181828"), the gateway 140 is still capable of enforcing policy rules with regard to the actual user, notwithstanding that user's separation of his rogue protocol messages into two separate screen names. For example, if a particular policy rule restricts users from sending or receiving more than 100 IM messages each hour, the gateway 140 would be capable of restricting that individual actual user, operating under any one or more screen names, from sending or receiving more than 100 IM messages each hour for all screen names combined.

The method 300 is repeated for each rogue protocol message (or at least for those rogue protocol messages initiating sessions) received by the gateway 140.

Alternative Embodiments

Although preferred embodiments are disclosed herein, many variations are possible which remain within the concept, scope, and spirit of the invention. These variations would become clear to those skilled in the art after perusal of this application.

Those skilled in the art will recognize, after perusal of this application, that these alternative embodiments are illustrative and in no way limiting.

The invention claimed is:

1. A computer-implemented method comprising:
    intercepting a first message from a client device associated with an actual user, the first message being generated according to an instant messaging protocol, said first message being associated with a first screen name usable in conjunction with said instant messaging rogue protocol;

determining a name of the actual user, said determining comprising:
  obtaining from the first message a network address of the client device;
  using the network address to access user identification information stored in a registry of the client device; and
  using the user identification information to request a name of the actual user from a domain controller;
storing data representing an association between the actual user name and the first screen name in computer storage;
intercepting a second message associated with the instant messaging protocol, the second message being associated with a second screen name of the actual user;
storing a second association between the actual user name and the second screen name in the computer storage; and
enforcing a policy rule based on said first and second associations, said enforcing the policy rule comprising restricting the actual user from sending or receiving a predetermined number of messages associated with the instant messaging protocol.

2. The method of claim 1, wherein said intercepting the second message comprises intercepting the second message from a second client device associated with the actual user.

3. The computer-implemented method of claim 1, wherein said intercepting the first and second messages is performed with a gateway module executing on a computing device.

4. The computer-implemented method of claim 1, wherein the user identification information comprises a globally unique identifier (GUID).

5. The computer-implemented method of claim 1, wherein said restricting comprises limiting the number of instant messages associated with any screen name of the actual user to a specified rate.

6. The computer-implemented method of claim 3, wherein the gateway module and the client device are associated with a same enterprise network.

7. The computer-implemented method of claim 6, wherein said accessing the registry of the client device is performed by an authorization server coupled to the enterprise network and in communication with the gateway module.

8. A system for enforcing policy rules against actual users of a computer network, the system comprising:
  a gateway operative to receive first and second messages from at least one client device associated with an actual user, the first and second messages being generated according to an instant messaging protocol, said first message being associated with a first screen name and said second message being associated with a second screen name usable in conjunction with said instant messaging protocol;
  an authorization server operative to determine a name of the actual user in response to receiving an identification request from the gateway, wherein the authorization server is operative to:
    use a network address of the at least one client device to access user identification information stored on the at least one client device; and
    use the user identification information to request an identity of the actual user; and
  the gateway being further operative to:
    store data representing an association between the actual user identity and the first and second screen names in computer storage, and
    enforce a policy rule by restricting the actual user from sending or receiving a total number of instant messages associated with the instant messaging protocol within a given time period.

9. The system of claim 8, wherein the gateway executes on a computing device in communication with the authorization server over a local area network (LAN).

10. The system of claim 8, wherein the user identification information comprises a globally unique identifier (GUID).

11. The system of claim 8, further comprising a firewall device configured to redirect at least one of the first and second messages from the at least one client device to the gateway.

12. The system of claim 8, wherein the at least one client device comprises first and second client devices, wherein the first message is received from the first client device and the second message is received from the second client device.

13. The system of claim 11, wherein the firewall device further comprises one or more recognition patterns for identifying the instant message protocol of the at least one of the first and second messages from a plurality of messages received from an enterprise network.

14. A system for enforcing policy rules against actual users, the system comprising:
  means for intercepting first and second messages from a client device associated with an actual user, the first and second messages being generated according to an instant messaging protocol, said first and second messages being associated with, respectively, first and second screen names usable in conjunction with said instant messaging protocol, wherein said intercepting means is executed on a computing device;
  means for determining a name of the actual user for each of the first and second messages, said means for determining comprising:
    means for obtaining from the message a network address of the client device;
    means for using the network address to access user identification information from a registry of the client device; and
    means for using the user identification information to request a name of the actual user from a domain controller;
  means for storing data representing an association between the actual user name and the first and second screen names in computer storage; and
  means for enforcing a policy rule in response to intercepting the first and second messages by restricting the actual user from sending or receiving an additional number of messages associated with the instant messaging protocol.

* * * * *

UNITED STATES PATENT AND TRADEMARK OFFICE
CERTIFICATE OF CORRECTION

PATENT NO. : 7,657,616 B1
APPLICATION NO. : 10/167229
DATED : February 2, 2010
INVENTOR(S) : Poling et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1573 days.

Signed and Sealed this

Twenty-eighth Day of December, 2010

David J. Kappos
*Director of the United States Patent and Trademark Office*